United States Patent [19]

Meier

[11] Patent Number: 4,504,751
[45] Date of Patent: Mar. 12, 1985

[54] FAN WITH ELECTRONICALLY COMMUTATED DIRECT-CURRENT MOTOR

[75] Inventor: Peter Meier, Lindau, Switzerland

[73] Assignee: Micronel AG, Tagelswangen, Switzerland

[21] Appl. No.: 559,190

[22] Filed: Dec. 7, 1983

[30] Foreign Application Priority Data

Dec. 10, 1982 [CH] Switzerland .................. 7219/82

[51] Int. Cl.³ .............................................. H02K 9/06
[52] U.S. Cl. ........................................ 310/62; 310/63;
310/68 R; 318/254
[58] Field of Search .................. 310/62, 63, 68 R, 156,
310/268, DIG. 3; 318/254 A, 254, 138, 439;
123/41.11, 41.12

[56] References Cited

U.S. PATENT DOCUMENTS

| | | | |
|---|---|---|---|
| 3,840,761 | 10/1974 | Muller | 310/49 R |
| 3,867,656 | 2/1975 | Mitsui et al. | 310/68 |
| 4,164,690 | 8/1979 | Müller et al. | 318/254 A |
| 4,181,867 | 1/1980 | Müller | 310/156 |
| 4,360,751 | 11/1982 | Arnold et al. | 310/63 X |
| 4,366,405 | 12/1982 | Schmider | 310/68 R X |
| 4,459,087 | 7/1984 | Barge | 310/63 X |

FOREIGN PATENT DOCUMENTS

| | | | |
|---|---|---|---|
| 55-109166 | 8/1980 | Japan | 310/156 |
| 56-62060 | 5/1981 | Japan | 318/254 |
| 57-180364 | 11/1982 | Japan | . |
| 2000646 | 1/1979 | United Kingdom | 310/156 |

Primary Examiner—William M. Shoop
Assistant Examiner—Bentsu Ro
Attorney, Agent, or Firm—Webb, Burden, Robinson & Webb

[57] ABSTRACT

An electronically commutated, direct-current motor of a fan has, in a two-piece housing, a stator formed on one piece of the housing and a blade-equipped rotor attached to a shaft mounted in the housing. The rotor supports an odd number of diametrically opposed pairs of magnets which consist of permanent magnets with opposite poles. On the stator are mounted two coils positioned diametrically, a Hall element, and a diametrically positioned flux-conduction plate that faces the pole surfaces of the magnets of the rotor and is angularly offset from the coils. The Hall element senses the poles of the magnets passing by and generates an output voltage. In response to the Hall element output voltage, an electronic control circuit in the stator sends an excitation current to the coils for alternately attracting or repelling the magnets. The rotor's rotational direction is determined by the resting position of the magnets, as imposed by the flux-conduction plate associated with the coils. This fan has only a few components, is very flat, and runs very smoothly.

11 Claims, 9 Drawing Figures

FAN WITH ELECTRONICALLY COMMUTATED DIRECT-CURRENT MOTOR

BACKGROUND OF THE INVENTION

1. Field of the Invention

The present invention relates to a fan with a direct-current motor which is commutated electronically by means of a Hall element controlled switching circuit.

2. Brief Description of the Prior Art

A fan with an electronically commutated direct-current motor is known as shown in Japanese Patent Specification No. 56-63350 (Publication No. 57-180364). In one configuration of this prior art fan, the permanent magnets are designed as adjoining sectors of alternating polarity, which together form a disk. Two likewise adjacent coils of the stator are designed such that the angle between those conducting parts of the coils which contribute to the generation of torque is approximately equal to the pole width of the permanent magnets, i.e. the shape and size of each coil are approximately equal to those of the sector-shaped magnets. A ferromagnetic disk is mounted as a magnetic return path for the magnetic field. A disadvantage of this prior art fan is the fact that there is no defined neutral position of the rotor with respect to the stator, and consequently the starting of the fan and the desired, predetermined direction of rotation is attainable only by means of a complicated and expensive set of electronic controls. In addition, the manufacture of the sector-shaped magnets and coils is also relatively expensive.

Certainly there are electronically commutated direct-current motors without commutators of the art initially described (compare, for example, U.S. Pat. No. 3,840,761), in which the stator is equipped with two diametrically opposed coils of approximately square shape and with ferromagnetic elements which provide the rotor with a certain neutral position with respect to the stator and which thus achieve an acceleration of the motor from rest in a predetermined direction of rotation. Such ferromagnetic elements, e.g., soft steel elements in an asymmetric pattern or specially shaped pieces of soft ferrite, thus make rather difficult an economical manufacture of these motors of the prior art. With the latter, moreover, the rotor is divided into two disks, positioned on either side of the coils, which are equipped with permanent magnets, thus inconveniently raising the total height of the motor.

Accordingly, it is an object of the present invention to provide a fan of the initially described art which, under no-load conditions, always accelerates in a predetermined direction without special, expensive measures relating to the permanent magnets, the coils, the magnetic return path for the magnetic field of the coils and the electronic controls, and which allows a very flat structural shape with few components.

SUMMARY OF THE INVENTION

Accordingly, I have invented a fan with an electronically commutated direct-current motor. The motor has a stator and a blade-equipped rotor and the rotor is provided with an odd number of diametrically opposed pairs of magnets. Each of the pairs of magnets includes two permanent magnets with unlike poles. The individual permanent magnets of the rotor are separated one from the other in a circumferential arrangement and successive poles along the circumference are unlike. The stator is provided with two coils that are excited by an electronic control circuit. The stator also includes a Hall element that senses the magnetic field of the rotor's permanent magnets as they pass by and that subsequently generates a control voltage for the electronic control circuit. The two coils are positioned diametrically opposed on the stator and the Hal element is positioned circumferentially between the two coils. The stator has a magnetic return path associated with the coils which is a flux-conduction plate which extends diametrically and whose angular position is shifted in relation to that of the coils by a fraction or by a multiple of a fraction of the angular spacing between two circumferentially successive permanent magnets of the rotor.

By means of a simple arrangement of discrete, separated permanent magnets and the coordination of a simple flux-conduction plate with the two diametrically opposed coils, based on the components' relative depth along the fan's axis, a predetermined, constant neutral position of the rotor's permanent magnets with respect to the coils and the Hall element of the stator is achieved without additional measures. The fan reliably accelerates in the same direction from rest, even with a control circuit which contains only basic elements.

Moreover, since no additional means of conduction are necessary and since no special requirements are involved for the manufacture of the permanent magnets and the coils, except for the arrangement of these latter components according to their required number and positioning, a fan in accordance with the present invention can be economically mass-produced with fewer components while incorporating a smaller overall height.

An illustrative example of the fan as proposed by the invention is explained with the aid of the accompanying drawings.

DETAILED DESCRIPTION OF PREFERRED EMBODIMENTS OF THE INVENTION

Figure 2:
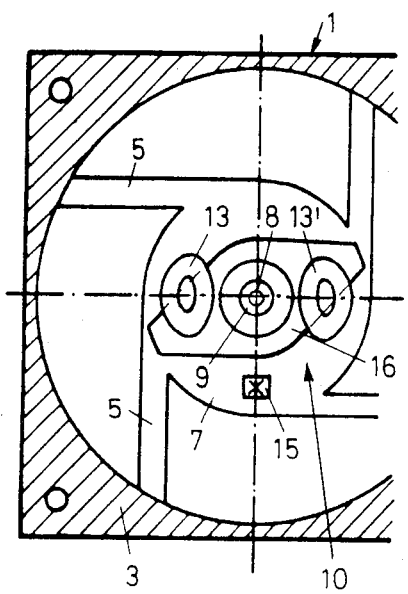
FIG. 2 is a cross-sectional view of the fan taken along line II—II of FIG. 3.

The fan shown in FIGS. 1 through 4 has a housing 1 which includes two open, frame-shaped housing casings 2 and 3. Each housing casing 2, 3 has a midsection 6, 7 connected by four tangentially hinged support arms 4, 5, respectively. The housing casings 2, 3 as well as the support arms 4, 5 and the midsections 6, 7 are each formed preferably as a single piece from, for example, a synthetic material. Both midsections 6, 7 serve as bearing shells for a shaft 8 and contain an inserted cup-shaped bearing 9 for this purpose. One of the midsections, midsection 7 as shown, additionally forms the fan motor's stator 10 that will be the object of more detailed discussion.

A rotor 11 of the fan motor is rigidly attached to the shaft 8 that is pivotally mounted in the cup-shaped bearing 9. The rotor 11 is disk-shaped and is equipped in the present illustrative example with six fan blades 12. The rotor 11 along with its blades 12 is also preferably manufactured as one piece from, for example, a synthetic material.

After mounting the rotor 11 and bonding the two housing casings 2, 3 together by adhesives, or by heat-sealing, or the like, the resulting housing 1 encloses the blades 12. The air which is drawn in or expelled in continually cut by the edges of the blades as a consequence of the tangential hinging of the support arms 4, 5 so that the air transmits only a small amount of sound, i.e. the fan produces little noise during operation.

Since the cup-shaped bearings 9 for the shaft 8 of the rotor 11 are positioned in front of and behind the blades 12, the bearing support is stable on both sides. Furthermore, neither end of the shaft 8 projects to the external surface of the midsections 6, 7 so that the fan is totally enclosed in the region of the shaft 8. In addition, the cup-shaped bearings 9 contain ample supply space for permanent lubrication.

Instead of the cup-shaped bearings 9, any other radial bearing or thrust bearing can be used. In particular, the shaft 8 of the rotor 11 can be mounted at either of its ends in a ball-bearing race located in the corresponding midsection 6, 7 whereby the base of the recess in the midsection which accommodates the ball bearing race is provided with an axial bearing seat for the finely machined end face of the shaft 8, with, for example, a small, sapphire plate.

Midsection 7, which forms the stator 10, has two diametrically opposed coils 13 and 13' mounted on an annular printed circuit board 14 that is located in a radially outer recess of the midsection 7. A Hall element 15 in the shape of a small plate is mounted on the printed circuit board 14 in a location which is angularly offset from the coils 13, 13', preferably by 90° as shown. Below the printed circuit board 14, i.e. on the side of the circuit board 14 that is turned away from the rotor 11, a flux-conduction plate 16 is mounted which extends diametrically over both coils 13, 13' (FIG. 2). However, the center line of the flux-conduction plate 16 is shifted by a small angle in the circumferential plane from the diametric center line of the coils 13, 13'. The printed circuit board 14 contains an electronic control circuit explained hereinafter in connection with FIG. 5, to which the coils 13, 13' and the Hall element 15 are connected.

The coils 13, 13' are preferentially coreless flat coils. It is particularly advisable to have a coil shape that is oval and approximately elliptical in the circumferential plane as shown. In has been proven advantageous to give the coil a shape that is, instead of a geometrical ellipse, an oval that is extended or broadened along the sides parallel to the minor axis, rather than along the sides parallel to the major axis.

Figure 5:
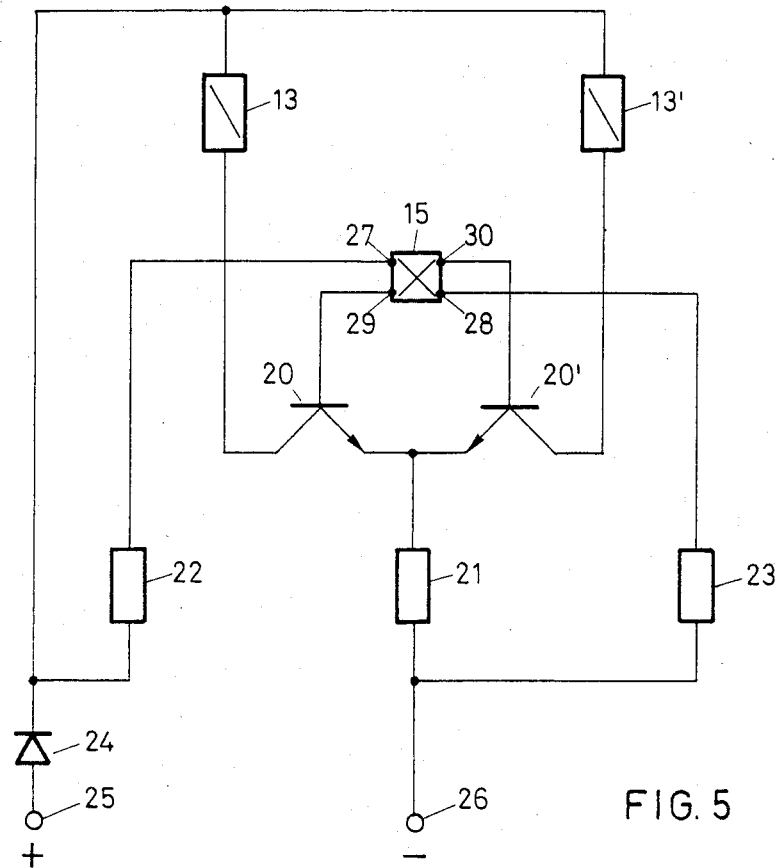
FIG. 5 is a circuit diagram of an electronic control circuit for the fan shown in FIGS. 1 through 4.

Rather than mounting an annular printed circuit board, it is also possible to provide and to position an annular, thick-film integrated circuit, in which are integrated the control components shown in FIG. 5.

The disk-shaped rotor 11, equipped with the blades 12, has an annular groove 17 into which the coils 13, 13' project. Six cylindrical permanent magnets 18, which are distributed uniformly around the circumference, are sunk in the groove 17 such that their faces fit rather snugly with the bottom surface of the groove 17. The permanent magnets alternately exhibit north N and south S poles so that every two diametrically opposed magnets 18 form a pair of permanent magnets with opposing N and S poles. Thus, for the present illustrative example, there are three pairs of magnets present, i.e. an odd number of pairs. The other faces of the magnets 18 are magnetically linked to each other by an annular, iron return-path piece 19 in a manner that is well understood in the art.

A circuit of the entire electronic control circuit included in the printed circuit board 14 is shown in FIG. 5. This control circuit contains the previously mentioned coils 13 and 13' as well as the plate-shaped Hall element 15. In addition, the control circuit includes two transistors 20 and 20' (as shown, npn-transistors), three resistors 21, 22, and 23, a diode 24, as well as terminals 25 and 26 for the positive or negative pole of a direct-current power source that is not shown. Pnp-transistors could be used instead of npn-transistors, with attention given to the corresponding polarities of the direct-current power source.

The coils 13 and 13' are switched into the commutator circuits of the transistors 20 and 20', respectively, and are both connected through the diode 24, which is provided as a polarity safeguard, to positive terminal 25. The emitters of the transistors 20, 20' are connected through the common current-limiting resistor 21 to negative terminal 26. In a manner that is well understood in the art, the Hall element 15 has two input terminals 27 and 28 and two output terminals 29 and 30. Input terminal 27 is connected to positive terminal 25 through resistor 22 and input terminal 28 is connected to negative terminal 26 through resistor 23. The output terminals 29 and 30 of the Hall element 15 are connected to the base of transistors 20 and 20', respectively.

If a magnetic flux propagating in a given direction passes through the Hall element 15, a voltage is generated at the output terminals 29, 30, in a manner that is well understood in the art, whose magnitude depends on the strength of the magnetic flux and whose polarity depends on the direction of the magnetic flux. Upon reversal of the direction of the magnetic flux, the polarity of the voltage generated at the output terminals 29, 30 changes accordingly. Thus, depending on the instantaneous strength of the magnetic flux passing through the Hall element 15, one of the transistors 20, 20' shown in the control circuit of FIG. 5 is being opened or switched into a conducting state, while the other transistor is correspondingly being closed or switched into a nonconducting state. The current flow develops in the coils 13 and 13' in the same manner.

Figure 1:
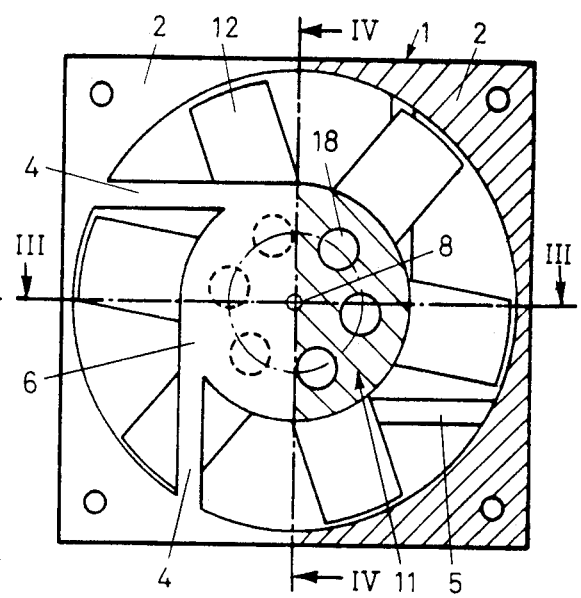
FIG. 1 shows in the right half a cross-sectional view of the fan along the one front face of the rotor's permanent magnets, and in the left half a view of one exterior surface of the fan housing, taken along line I—I of FIG. 3.
Figure 3:
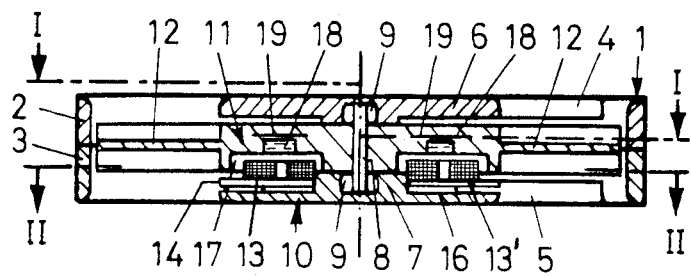
FIG. 3 is a cross-sectional view of the fan taken along line III—III of FIG. 1.
Figure 4:
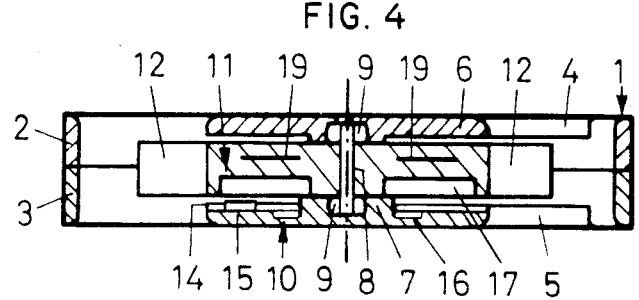
FIG. 4 is a cross-sectional view of the fan taken along line IV—IV of FIG. 1.
Figure 8:
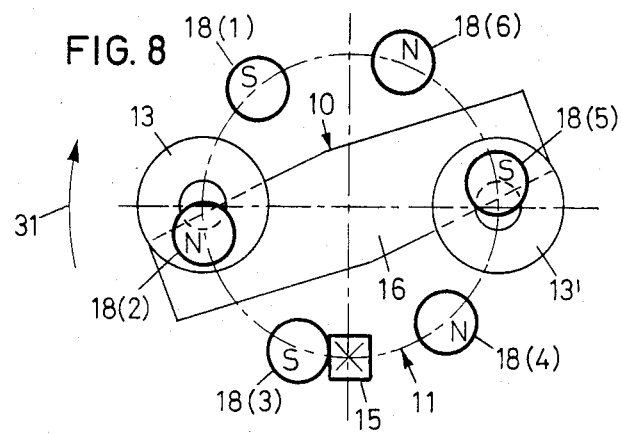
FIGS. 6 through 8 are schematic representations of the fan for various positions of the rotor with respect to the stator.
Figure 7:
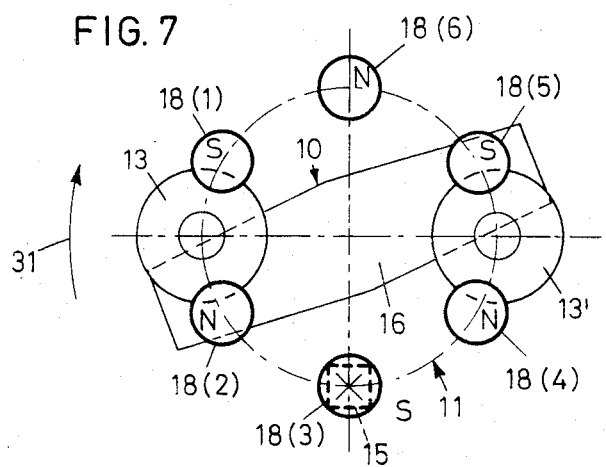
Figure 6:
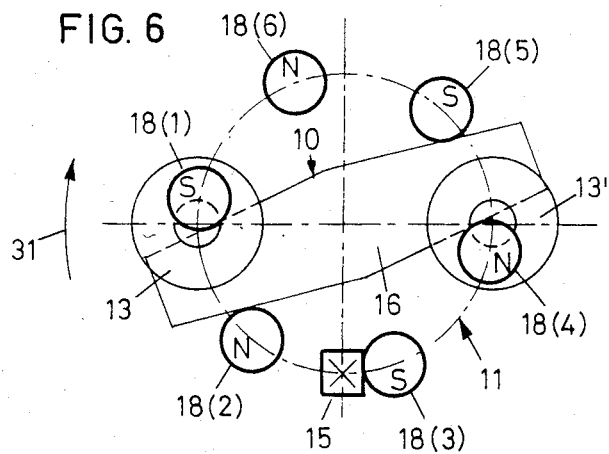

FIGS. 6 through 8 are schematic portrayals of various positions of the rotor 11 with reference to the stator 10 before and during the operation of the fan and, in particular, show the top view orientation of FIGS. 1 and 2. The figures show only the coils 13 and 13', the Hall element 15 and the flux-conduction plate 16 of the stator 10, as well as only the permanent magnets 18, along with the circle on which they are mounted in the rotor 11. The successive magnets on this circle are marked as 18(1), 18(2), 18(3), 18(4), 18(5) and 18(6). In addition, the permanent magnets' poles which are directed toward both the coils 13, 13' and the Hall element 15 are marked with S for a south pole and N for a north pole.

Figure 9:
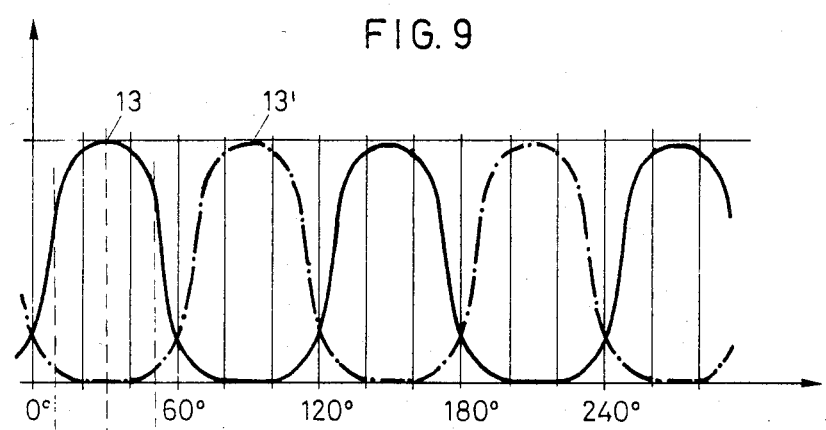
FIG. 9 is a graph showing the current flowing through the coils of the fan shown in FIGS. 1 through 4 as a function of the angle of rotation of the rotor with respect to the stator.

It is assumed for the example shown that a south pole S of the pertinent permanent magnet 18(1), 18(3), or 18(5), which is positioned opposite the Hall element 15, switches transistor 20 in the circuit diagram of FIG. 5 into the conducting state, so that a current then flows through coil 13. Conversely, a north pole N of permanent magnet 18(2), 18(4), or 18(6), which is positioned above the Hall element 15, gives rise to a corresponding control of transistor 20' and a subsequent current flow in coil 13'. It is furthermore assumed that, given a current flow in one of the coils 13, 13', a magnetic field is produced with the south pole on the side of the coils which are turned toward the permanent magnets 18. In FIG. 9, moreover, the currents of the coils 13 and 13' are represented as a function of the angle of rotation of the rotor 11 with reference to the diametric center line between the coils.

At rest, i.e. before a continuous voltage is established at positive terminal 25 and negative terminal 26, the rotor 11 assumes the position represented in FIG. 6, or possibly a position shifted from this former position by 60°, under the force of the flux-conduction plate 16. Consequently, magnet 18(1) with south pole S is positioned eccentrically in relation to coil 13. Magnet 18(3) with south pole S is positioned closer to the Hall element 15 than is magnet 18(2) with north pole N.

If a direct-current supply voltage is now established at positive terminal 25 and negative terminal 26 of FIG. 5, then current flows through coil 13 since a part of the magnetic field of magnet 18(3) passes through the Hall element 15. A fairly small current flows through coil 13', as is shown in FIG. 9 from the approximate 10° rotational angle of the rotor 11 at rest as compared to the coils 13, 13' of the stator 10. Since two like poles, namely south poles, face each other somewhat askew at the point of coil 13, magnet 18(1) of the rotor 11 is repelled by the magnetic field of coil 13, so that the rotor 11 begins to turn in the direction of arrow 31.

At a 30° angle of rotation, the current in coil 13 is at a maximum (FIG. 9) because transistor 20 is totally activated as a result of the overlapping position of magnet 18(3) and the Hall element 15. Magnet 18(2) with north pole N, which follows magnet 18(1), is simultaneously attracted by coil 13 in the rotational direction of the arrow 31. This position of the rotor 11 is illustrated in FIG. 7.

Upon further rotation of the rotor 11, magnet 18(2) reaches the region where it overlaps coil 13, whereby the current of coil 13 is still larger than that of the coil 13' since magnet 18(3) is positioned closer to the Hall element 15 than adjacent magnet 18(4); compare FIGS. 8 and 9 for an angle of rotation of about 50°. When magnets 18(2) and 18(5) are positioned congruently with coils 13 and 13' (angle of rotation 60°) which are facing them, respectively, a minimal current of equal magnitude flows through both coils as shown in FIG. 9.

The rotational movement of the rotor 11 continues as a result of the rotor's kinetic energy and the current in coil 13' increases as magnet 18(4) with north pole N approaches the Hall element 15. However, magnet 18(5) with south pole S thereby crosses the center of coil 13' so that, in accordance with the assumptions given, the magnet field of coil 13' which exhibits a south pole repels magnet 18(5) in the rotational direction of the arrow 31. The motion of the rotor 11 thus proceeds for the next 60°, through the action of coil 13', in the same manner as was the case for the motion of the first 60° through the action of coil 13. After disconnecting the control circuit of FIG. 5 from the direct-current supply source, the rotor 11 runs down until it stops. Due to the magnetic braking of the flux-conduction plate 16, however, the rotor 11 always stops in the same position, as shown in FIG. 6, or in a position rotated from this former position by an angle of 60°. In the case where the position is one which is rotated by 60° or 180° compared to that of FIG. 6, coil 13' is initially excited upon the start of the motor, since at that point magnet 18(2), 18(4), or 18(6) with north pole N is positioned closest to the Hall element 15.

As a result of the continuous control of the transistors 20 and 20' by the Hall element 15, the current flow in the coils 13 or 13' is quasi sinusoidal, as is shown in FIG. 9. The result is an especially smooth and quiet operation of the fan.

The rotational speed of the fan can easily be adjusted by a change in the voltage of the direct-current supply source.

By means of the attraction exerted by the flux-conduction plate 16 on the rotor 11 of the magnets 18, the shaft 8 of the rotor 11 always rests in the same bearing 9 located in the stator 10, which likewise produces a smooth and quiet operation of the fan and extends its operational lifetime.

Of course, instead of three pairs of permanent magnets 18, a larger odd number of such magnet pairs can also be provided.

The present fan has only one direction of rotation. However, not only because the housing 1 is very flat but also because the fan blades 12 are located at the midpoint of the depth of the housing 1 and the air inlet- and outlet-sides are formed identically with no shaft ends protruding, the fan can always be installed in one or the other orientation, depending on the desired direction of air discharge. Because of its low structural design and its ease of reversability, the present fan is especially suitable for installing between the conductor tracks of circuit boards in card stackers, for purposes of forced-ventilation of the circuit boards. The few and simple component parts of the present fan permit low-cost, economical production in large quantities.

Having described presently preferred embodiments of the invention, it is to be understood that it may be otherwise embodied within the scope of the appended claims.

I claim:

1. A fan with an electronically commutated direct-current motor, said motor having a stator and a blade-equipped rotor, said rotor being provided with an odd number of diametrically opposed pairs of permanent magnets, wherein each of said pairs comprises two permanent magnets with unlike poles, the individual permanent magnets of the rotor being separated one from each other in a circumferential arrangement, and whereby successive poles along the circumference are unlike, and said stator being provided with two coils that are excited by an electronic control circuit and with a Hall element that senses the magnetic field of the rotor's permanent magnets as they pass by and generates a control voltage for the control circuit, and the two coils being positioned diametrically on the stator and the Hall element being positioned circumferentially between the two coils, wherein the stator has a magnetic return-path associated with the coils, said magnetic return-path of the stator being a flux-conduction plate which extends diametrically and whose angular position is shifted in relation to that of the coils by a fraction or by a multiple of a fraction of the angular spacing between two circumferentially successive permanent magnets of the rotor.

2. The fan according to claim 1, further including a housing which comprises two housing casings, each of which has a frame-shaped outer section and an attached midsection that contains a bearing for receiving a rotor shaft which in turn supports a rotor body located between the two housing casings, whereby the midsection of one housing casing serves as a support for a stator body.

3. The fan according to claim 2, wherein the bearing of at least one of the midsections is formed as a radial bearing and as a thrust bearing for the rotor shaft such that the end of the shaft is covered from the outside by the midsection.

4. The fan according to claim 2, wherein the midsection of each housing casing is attached to the frame section of the housing casing by tangentially hinged arms.

5. The fan according to claims 1, 2, 3 or 4, wherein each housing casing is formed as a single piece out of a synthetic material.

6. The fan according to claim 2, wherein the rotor has a disk-shaped rotor body which is attached on the rotor shaft between the two housing casings, and said rotor body includes fan blades arranged along its circumferential face.

7. The fan according to claim 6, wherein the rotor body with the blades is formed as a single piece from a synthetic material.

8. The fan according to claim 1, wherein the coils are coreless flat coils which are shaped as ovals elongated with respect to the periphery of the stator.

9. The fan according to claim 8, wherein the oval flat coils are widened along the sides parallel to their minor axes.

10. The fan according to claim 1, wherein the Hall element is positioned at the stator's exact circumferential midpoint between the two coils.

11. The fan according to claim 2, wherein the rotor body includes an annular groove into which the coils of the stator project and in whose base the permanent magnets are positioned, and further includes an annular iron return-path piece located in the rotor body and associated with the permanent magnets.

* * * * *